(12) United States Patent
Hollins

(10) Patent No.: US 7,023,801 B1
(45) Date of Patent: Apr. 4, 2006

(54) SPECULATIVE PACKET SELECTION FOR TRANSMISSION OF ISOCHRONOUS DATA

(75) Inventor: Jack B. Hollins, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/457,021

(22) Filed: Dec. 7, 1999

(51) Int. Cl.
*H04J 1/16* (2006.01)
*H04L 1/00* (2006.01)
*H04L 12/26* (2006.01)
*H01R 31/08* (2006.01)

(52) U.S. Cl. ............... 370/235; 370/230; 370/231; 370/412; 709/223; 709/228; 710/52; 710/53; 710/54; 713/600; 714/1; 714/2; 714/47; 714/798; 714/799

(58) Field of Classification Search ............ 370/410, 370/396, 428, 412, 468, 229, 230–232, 465, 370/235, 389, 392, 393, 413, 417; 710/52–54; 709/223, 228, 232; 714/1, 2, 25, 47, 48, 714/798, 799; 713/600
See application file for complete search history.

(56) References Cited

U.S. PATENT DOCUMENTS

| | | | | |
|---|---|---|---|---|
| 5,845,152 A | | 12/1998 | Anderson et al. ............ 395/872 |
| 5,872,823 A | * | 2/1999 | Sutton ........................ 370/236 |
| 6,081,513 A | * | 6/2000 | Roy ............................ 370/260 |
| 6,243,783 B1 | * | 6/2001 | Smyers et al. ............... 710/310 |
| 6,317,440 B1 | * | 11/2001 | Sung ........................... 370/505 |
| 6,347,097 B1 | * | 2/2002 | Deng ........................... 370/498 |
| 6,385,212 B1 | * | 5/2002 | Baba et al. .................. 370/506 |
| 6,449,631 B1 | * | 9/2002 | Takamoto et al. ........... 370/230 |
| 6,532,213 B1 | * | 3/2003 | Chiussi et al. ............ 370/230.1 |

OTHER PUBLICATIONS

International Standard CEI/IEC 61883-1:1998, pp. 3-83.
International Standard CEI/IEC 61883-4:1998, pp. 3-23.
*IEEE Standard for a High Performance Serial Bus*, IEEE Std. 1394-1995, Aug. 30, 1996, Chapter 4, pp. 49-112.
*IEEE Standard for a High Performance Serial Bus*, IEEE Std. 1394-1995, Aug. 30, 1996, Chapter 6, pp. 137-172.
*IEEE Standard for a High Performance Serial Bus*, IEEE Std. 1394-1995, Aug. 30, 1996, Annex J, pp. 333-348.

* cited by examiner

*Primary Examiner*—Wellington Chin
*Assistant Examiner*—Raj Jain
(74) *Attorney, Agent, or Firm*—Christopher P. Maiorana, P.C.

(57) ABSTRACT

A refetch logic propagates data from a first source to a link controller by default. The link controller prefetches data from the refetch logic to generate a first packet prior to receiving control of the transmission medium on which the data is to be transmitted. The refetch logic changes sources and propagates to the link controller data from a second source if necessary. At the same time, the refetch logic also causes the link controller to discard the first packet and generate a second packet from data provided by the second source.

20 Claims, 10 Drawing Sheets

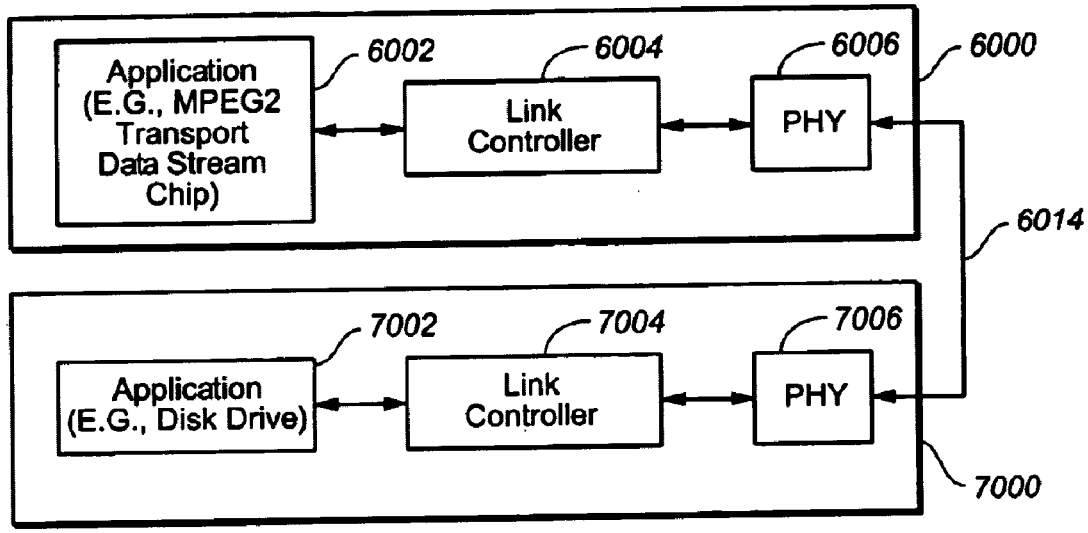
FIG._1A
(PRIOR ART)
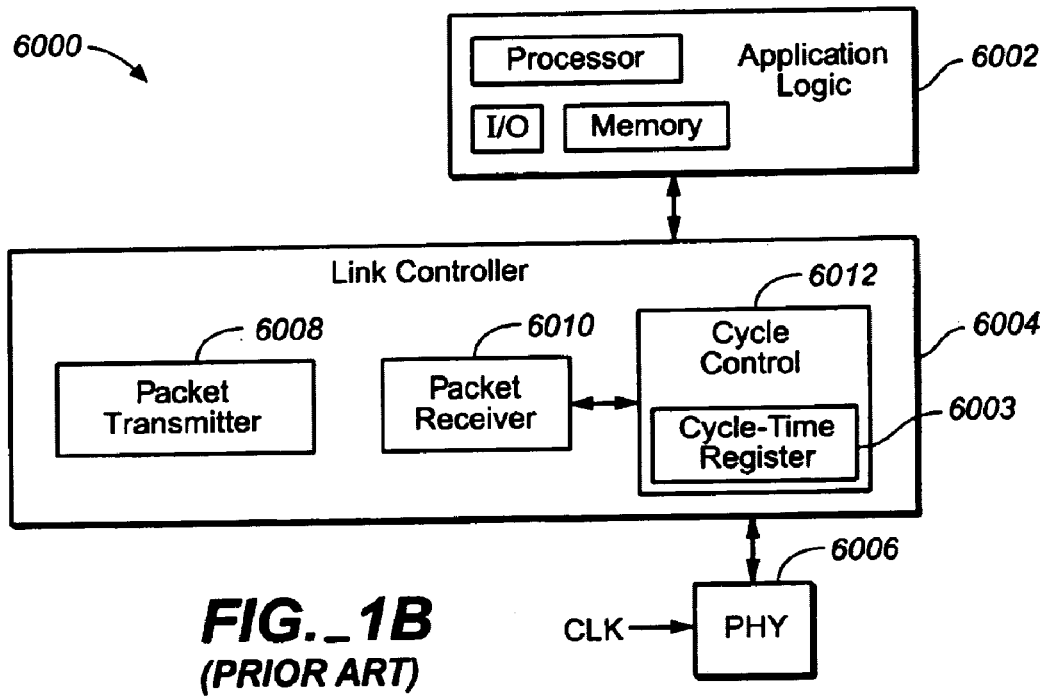
FIG._1B
(PRIOR ART)

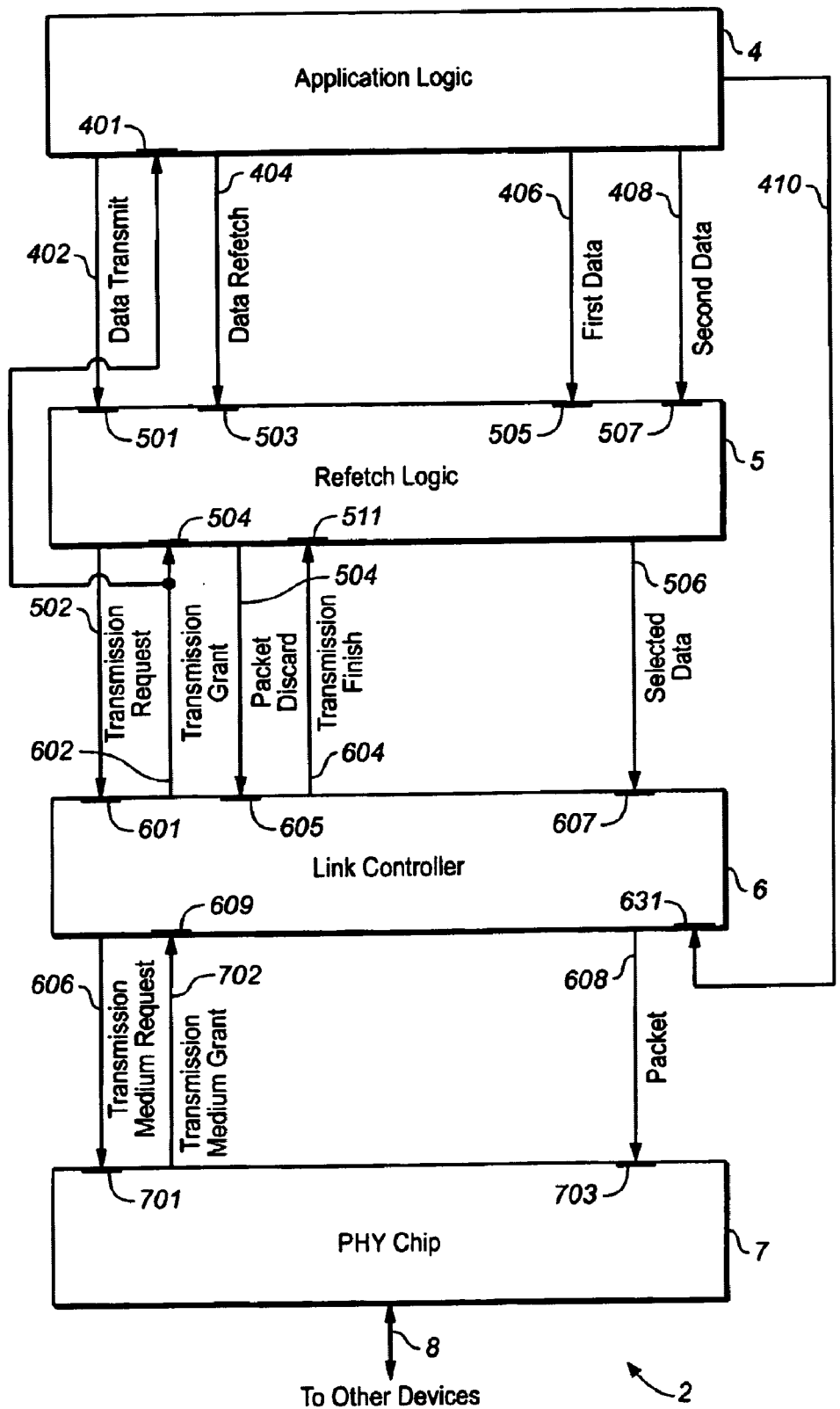
FIG._2

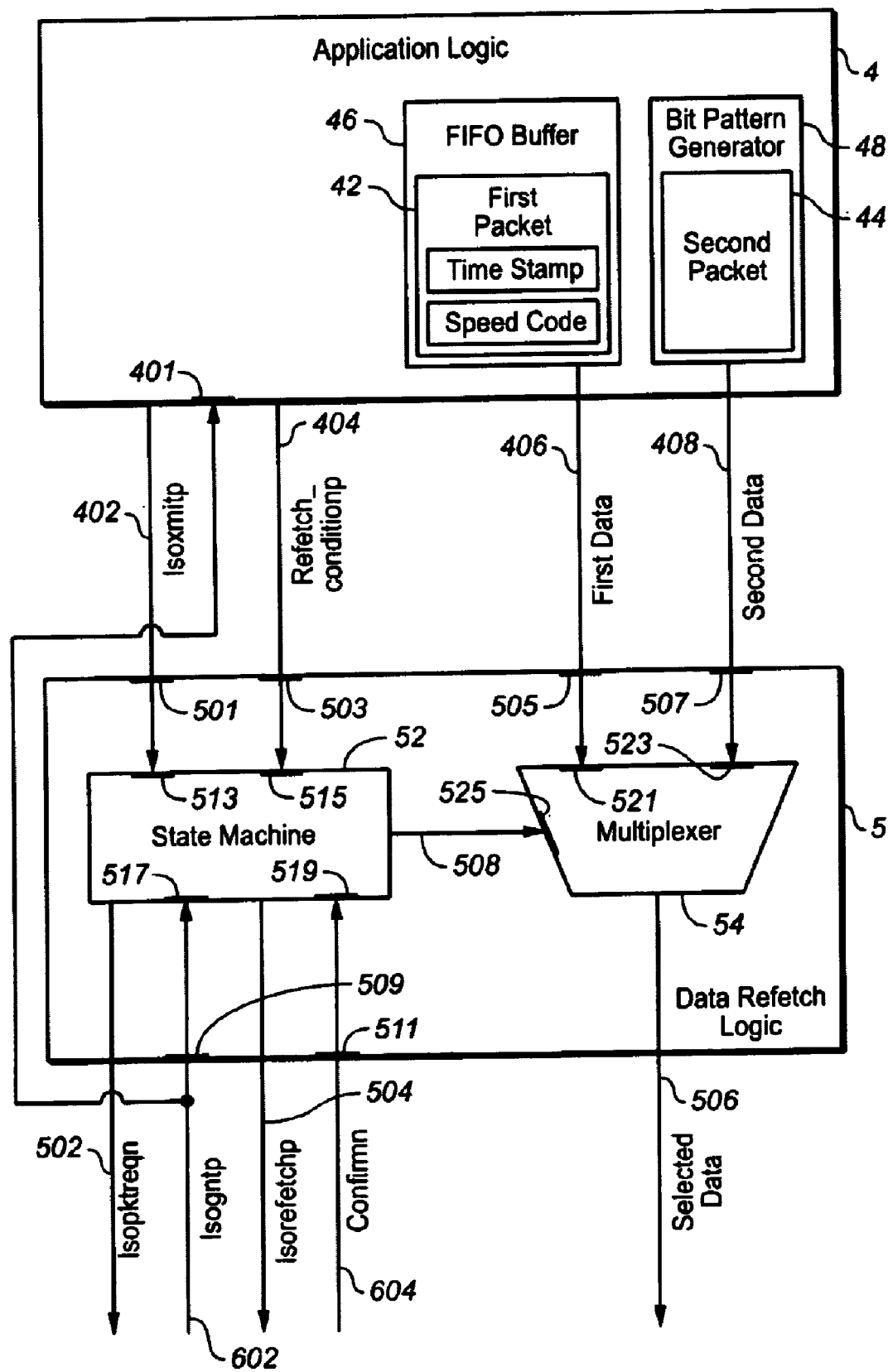
FIG._3

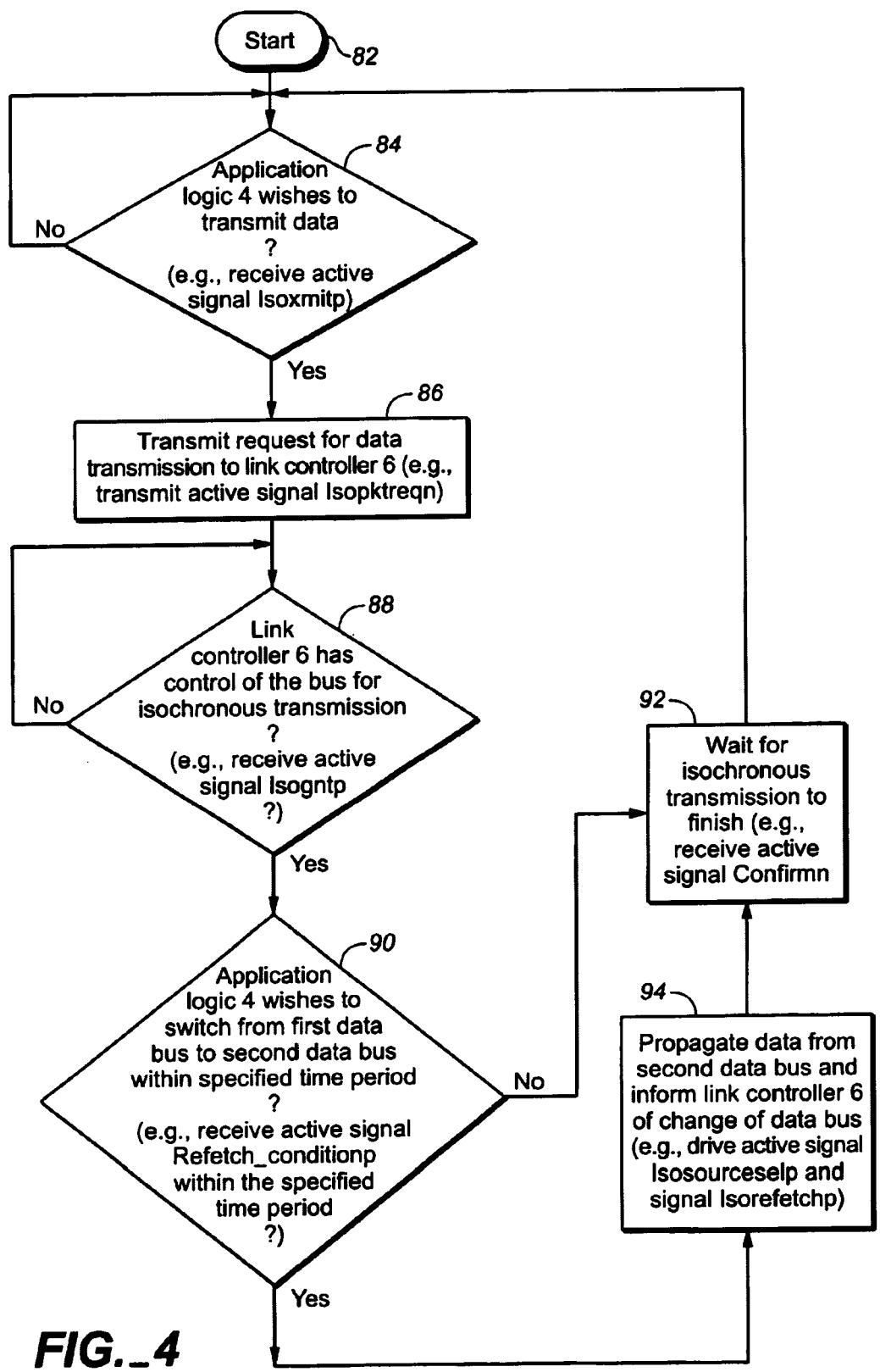
FIG._4

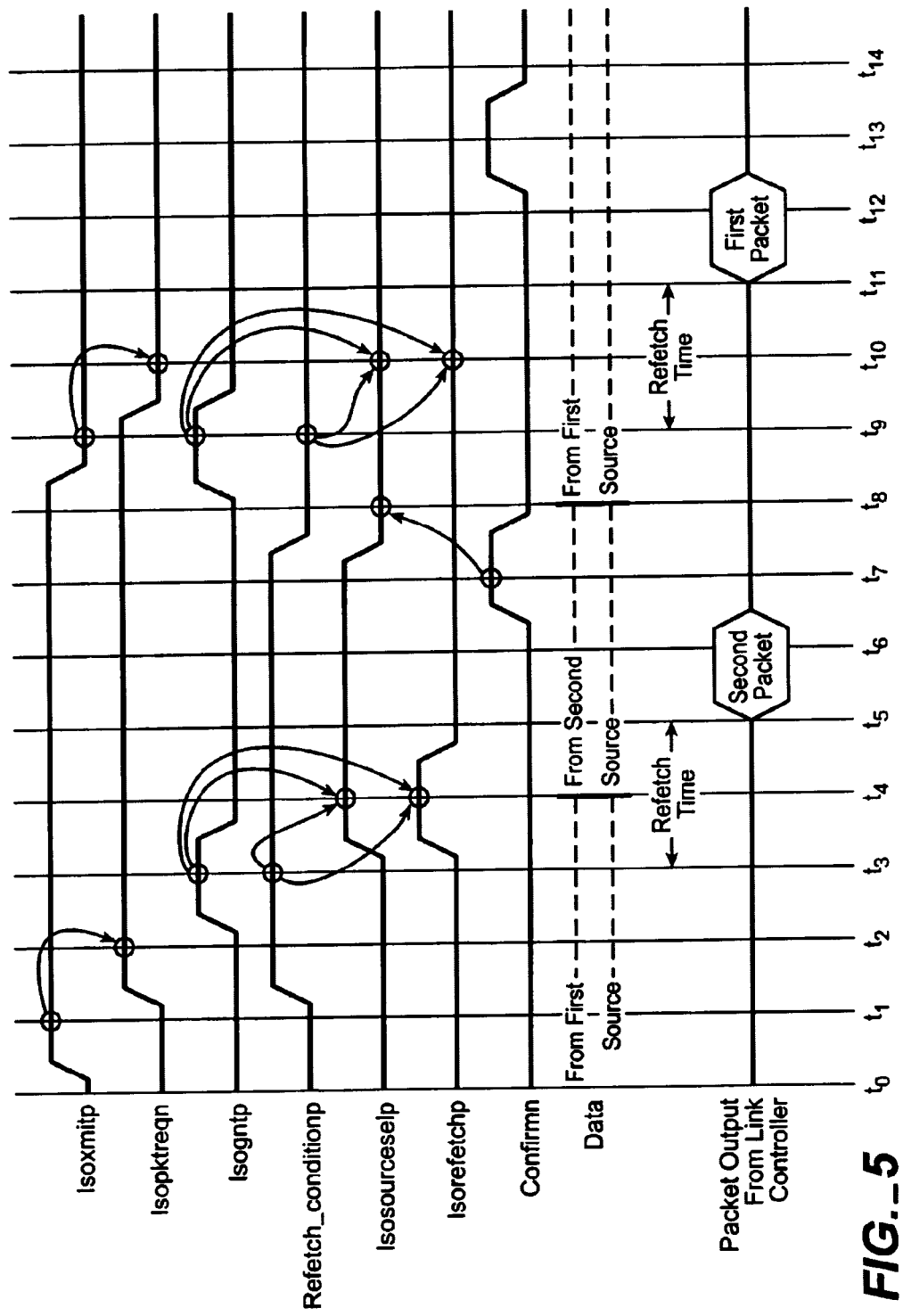
FIG._5

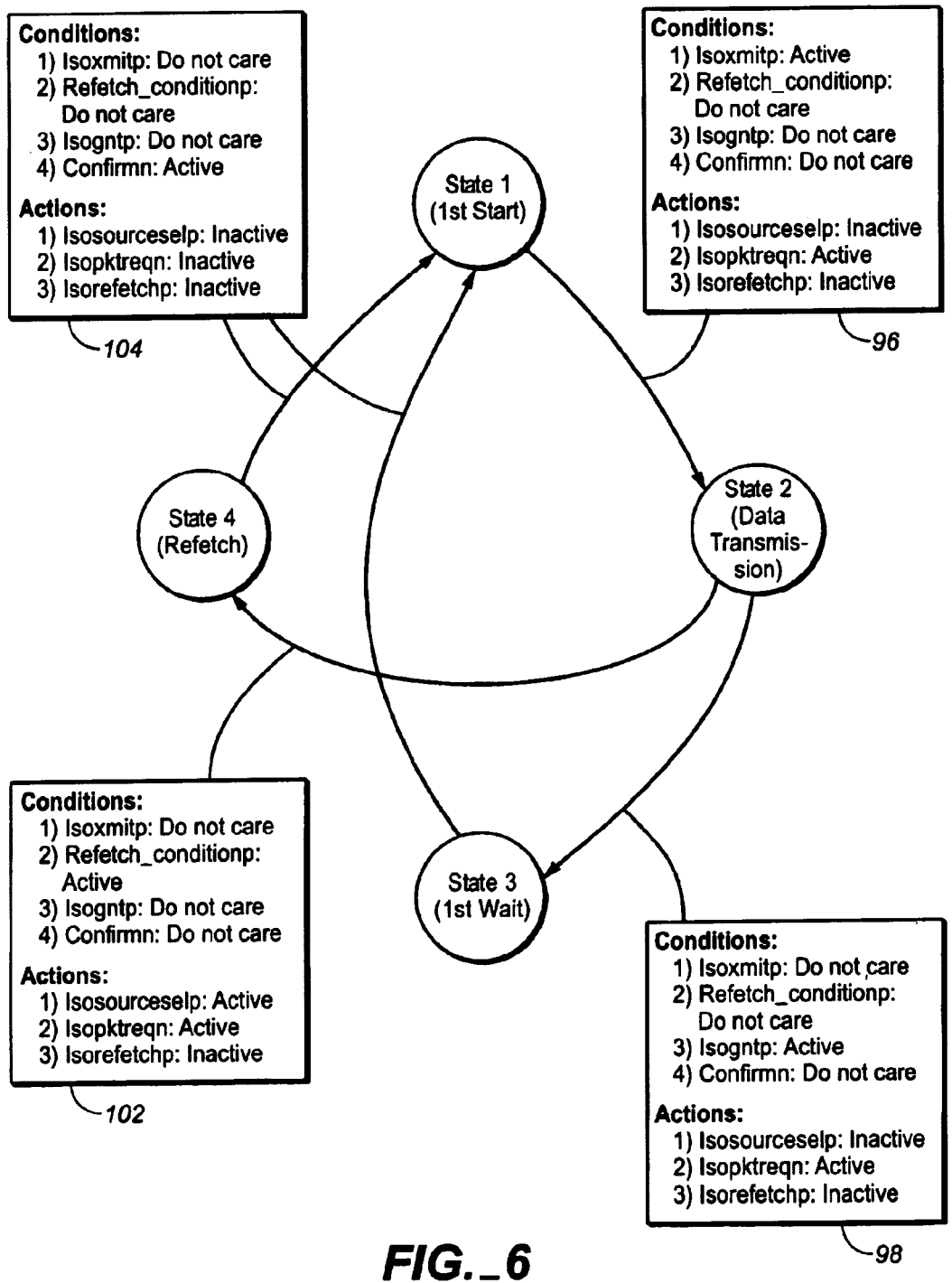
FIG._6

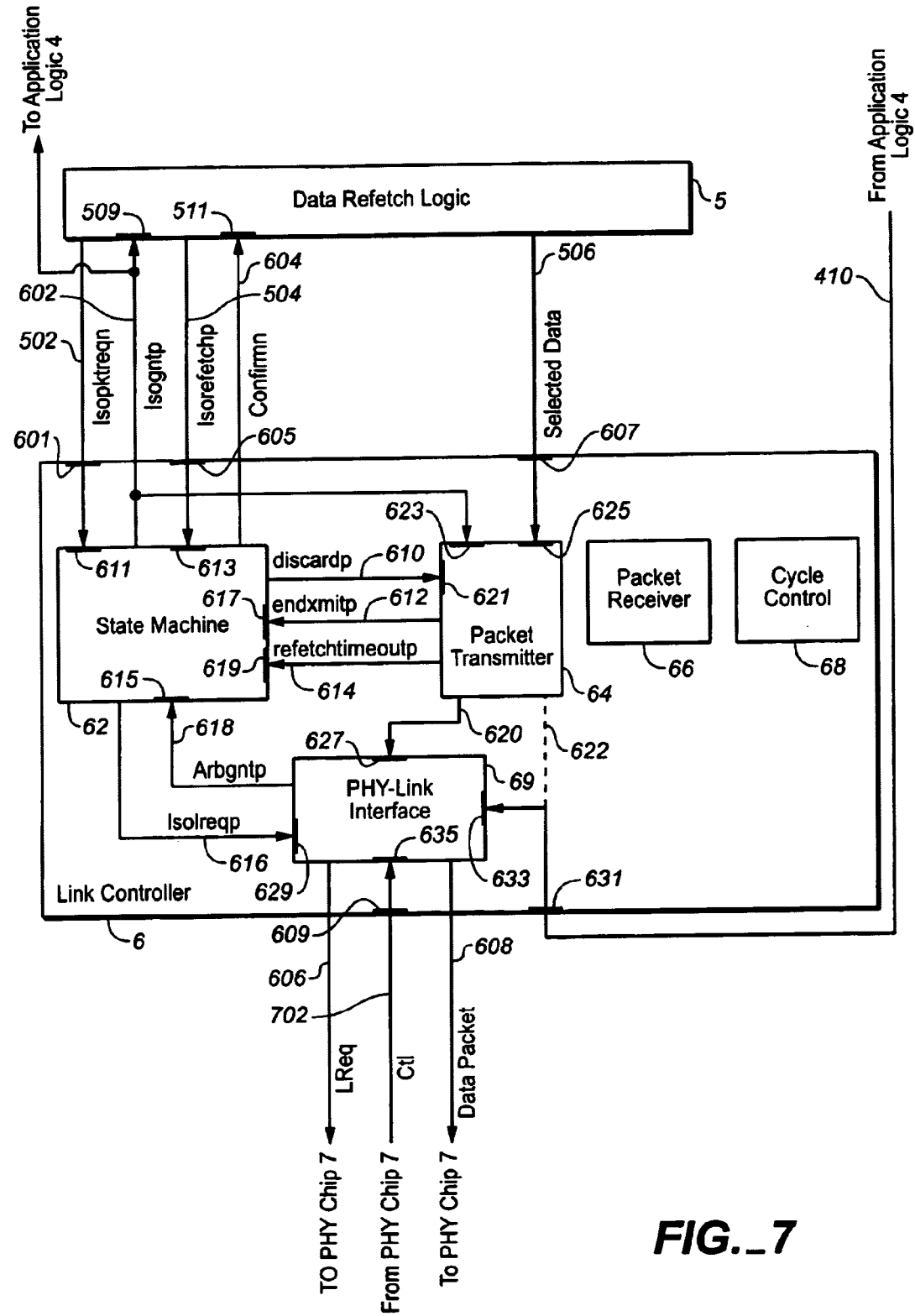
FIG._7

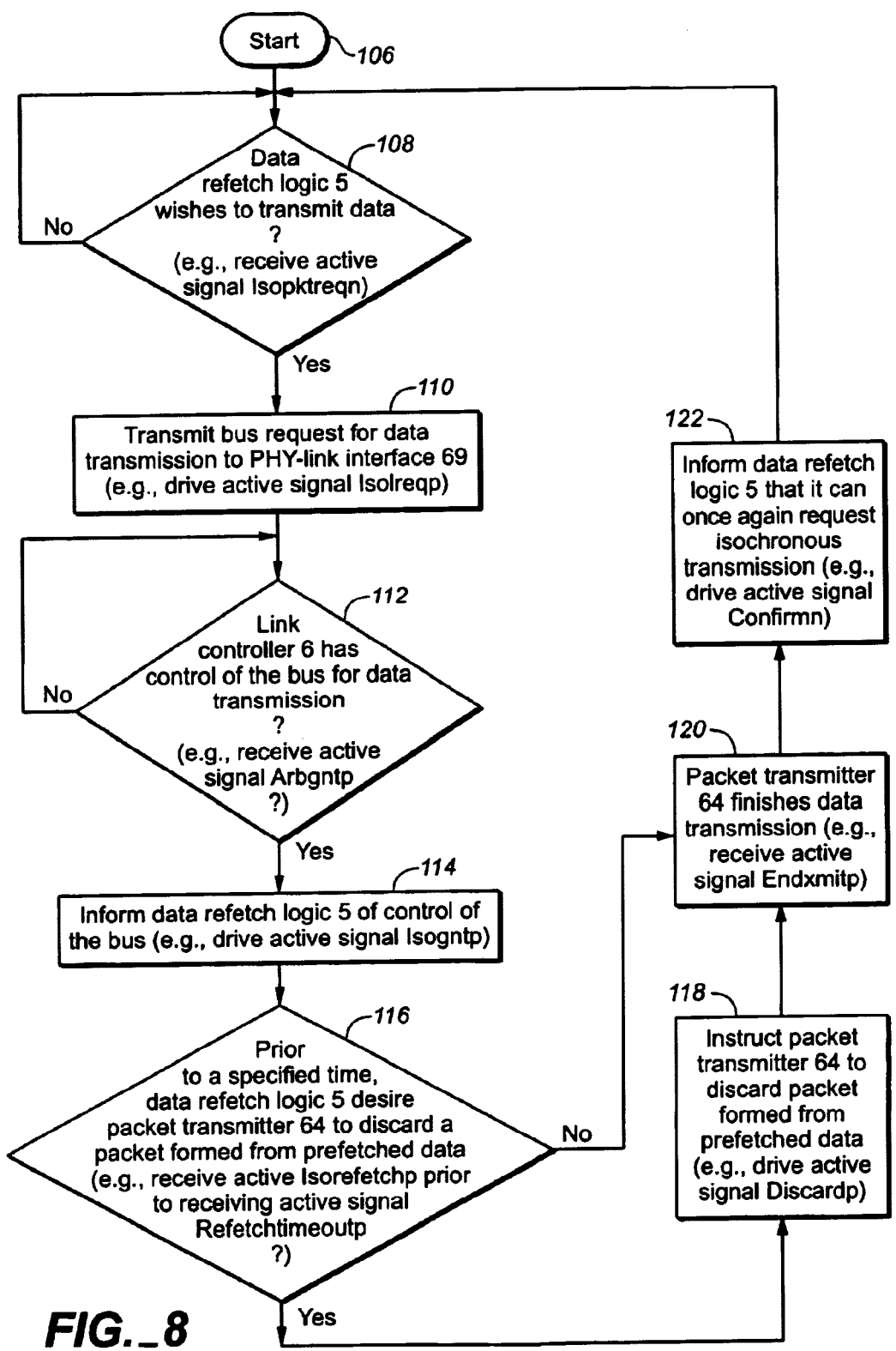
FIG._8

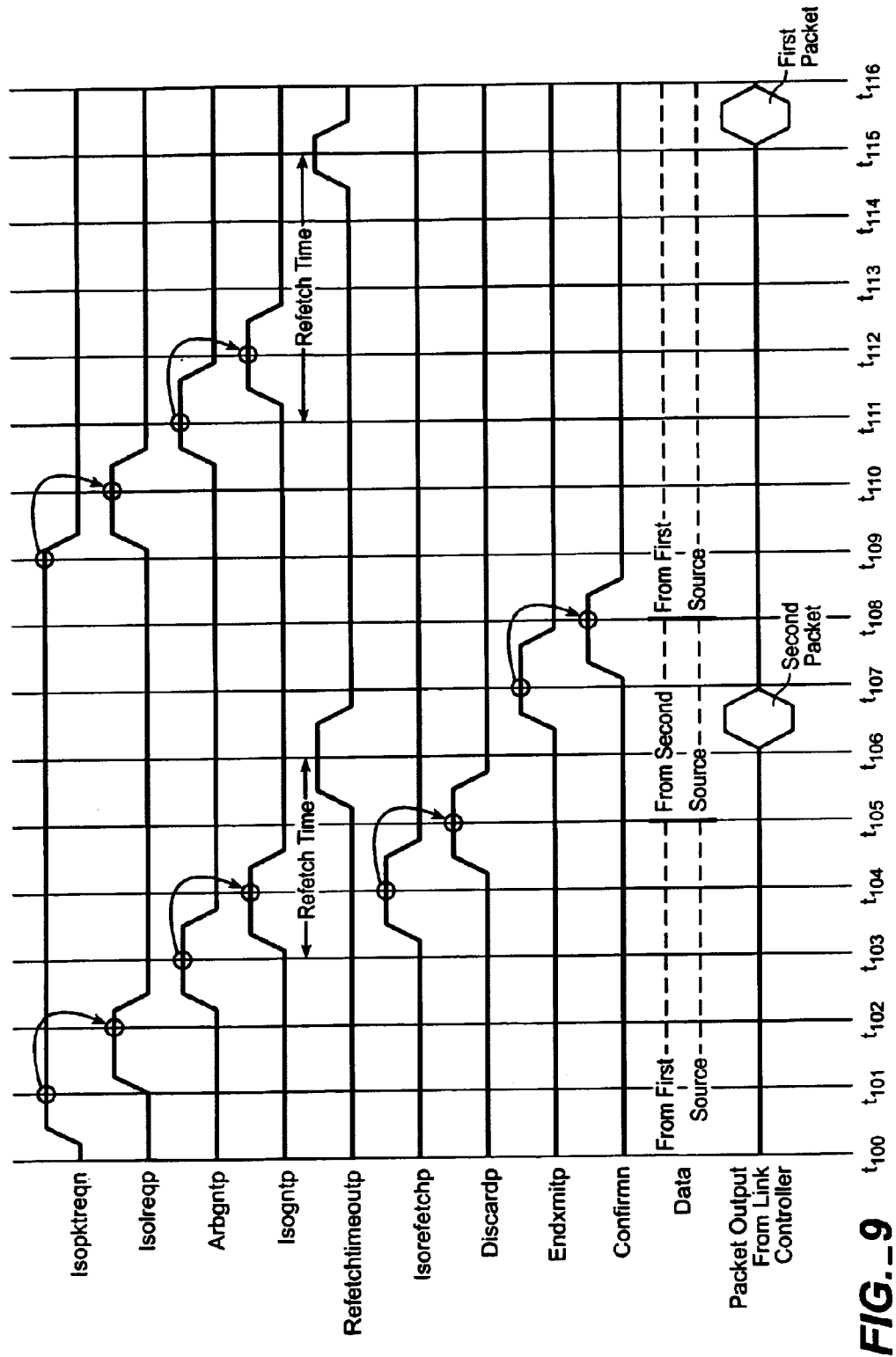
FIG._9

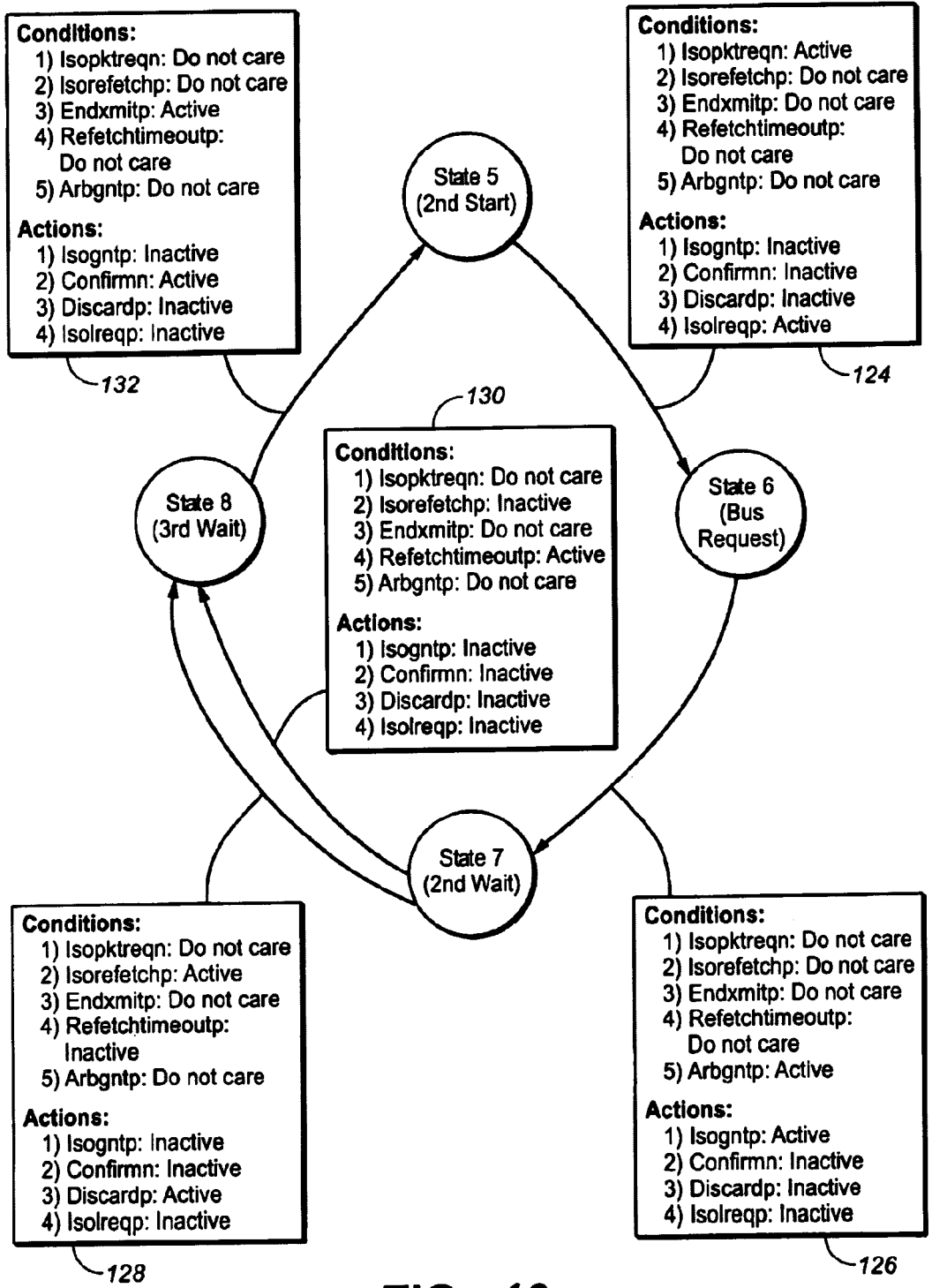
FIG._10

SPECULATIVE PACKET SELECTION FOR TRANSMISSION OF ISOCHRONOUS DATA

CROSS-REFERENCE TO RELATED APPLICATION

This application is related to and incorporates by reference herein the commonly owned co-pending U.S. Pat. No. 6,633,989, entitled "Method and Mechanism fro Synchronizing a Slave's Timer To A Master's Timer," inventor Jack B. Hollins, filed Nov. 30, 1999.

CROSS-REFERENCE TO SOURCE CODE APPENDIX

Appendix A and Appendix B, which are part of the present disclosure, contain VERILOG source code for implementing one embodiment of this invention as described more completely below.

A portion of the present disclosure contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

IEEE 1394 High Performance Serial Bus ("IEEE 1394 standard") provides a protocol for a high speed serial bus that supports isochronous data transfer. In isochronous data transfer, data is broadcasted on assigned channels with guaranteed bandwidth allocation. IEEE 1394 standard is available from the Institute of Electrical and Electronic Engineers located at 345 East 47th Street, New York, N.Y. 10017-2394. IEEE 1394 standard can be purchased from IEEE's web site at http://www.ieee.org/. IEEE 1394 standard is hereby incorporated by reference in its entirety.

An implementation of IEEE 1394 standard includes a first node 6000 and a second node 7000 coupled through a cable 6014 (FIG. 1A). Node 6000 includes an application logic 6002, a link controller 6004, and a physical layer chip 6006 (also called "PHY chip"). Circuitry included in application logic 6002 (FIG. 1B) depends on the application. For example, for a set top box, logic 6002 includes RF tuner, IF tuner, forward error correction circuit, MPEG2 transport stream decoder, MPEG2 video decoder, MPEG2 audio decoder, smartcard interface, and memory (ROM and RAM). Similarly, node 7000 includes another application logic 7002, a link controller 7004, and a PHY chip 7006. Link controller 6004 (FIG. 1B) includes a packet transmitter 6008, a packet receiver 6010, and a cycle control 6012. To transmit data, link controller 6004 makes a bus request to PHY chip 6006. After winning bus arbitration, PHY chip 6006 informs link controller 6004 that it has the bus and may transmit data.

IEC 61883-4 provides that "[i]f not enough data is available to transmit in the isochronous packet, then an empty packet shall be transmitted." P.9. IEC 61883-4 also provides that "[i]f for some reason the delay in the transmitter is too long, resulting in a time stamp which points in the past (late packet), then this source packet is not transmitted." P.13. IEC 61883-1 provides the details as to how to generate a empty common isochronous packet. IEC 61883-1 and IEC 61883-4 are available from the International Electrotechnical Commission, 3, rue de Varembé, P.O. Box 131, CH—1211 Geneva 20, Switzerland. IEC 61883-1 and IEC 61883-4 can be purchased from IEC's web site at http://www.iec.ch/home-e.htm. IEC 16883-1 and IEC 61883-4 are hereby incorporated by reference in its entirety.

SUMMARY

In accordance with the present invention, a refetch logic coupled between an application logic and a link controller selectively passes data from one of two data sources in the application logic to the link controller. The link controller uses the data to begin generation of a packet even before receiving control of a medium (such as a bus) on which the packet is to be transmitted. In one example, the refetch logic supplies the link controller with data from a first source for generating a packet in anticipation of transmission. In the example, prior to transmission of the packet, the refetch logic may switch from the first source to a second source if necessary. The switch between sources may be necessary, for example, because there is not enough data provided by the first source for the packet to be formed or if the data from the first source is too old to be sent. The ability to switch sources allows the link controller to request control of the transmission medium prior to receiving from the application logic the data that is to be transmitted (in the case when data from the second source which is actually transmitted is sent after data from the first source).

In one embodiment, the refetch logic propagates by default the data from a first bus of the application logic to the link controller. The link controller reads data supplied by the refetch logic and starts to generate a packet. If the application logic (containing the two data sources) decides to transmit data from a second bus prior to transmission of the just-described packet, the refetch logic propagates data from the second bus to the link controller. The refetch logic also instructs the link controller to discard the just-described packet (formed from data of the first source) and to generate a new packet.

In this embodiment, at the time of providing data from the first source, the refetch logic also makes a request to the link controller to transmit data. The link controller then makes a request to a physical layer chip to obtain control of the transmission medium on which data is to be transmitted. While waiting to receive control of the transmission medium, the link controller reads data from the refetch logic and starts to generate a packet. After receiving control of the transmission medium, the link controller transmits a status signal (informing the application logic and the refetch logic) that the link controller will start data transmission at a specified time in the future. The application logic must decide within the specified time whether to continue with data being supplied on the first bus or switch to a second bus (by driving a control signal called "data refetch signal").

In one implementation, the refetch logic includes a state machine that controls a multiplexer which selectively propagates data from one of the first bus and the second bus to the link controller. The state machine propagates data from the first bus to the link controller by default. On receipt of the data refetch signal (described above), the state machine propagates data from the second bus to the link controller and transmits a control signal (also called "packet discard signal") to the link controller. The link controller then discards the packet (also called "first packet") formed from the data supplied by first bus, and begins to generate a new packet (also called "second packet") from the second bus.

In this implementation, the link controller includes a packet transmitter that generates the first packet and also includes a state machine that controls the packet transmitter.

Specifically, the state machine in the link controller causes the packet transmitter to discard the first packet on receiving the packet discard signal. Thereafter, the packet transmitter generates a second packet from the data received from the refetch logic and supplies the second packet to the physical layer chip for transmission to another device. In this implementation, the packet transmitter starts transmission of the first packet if the packet discard signal is not received within the specified time.

BRIEF DESCRIPTION OF THE DRAWINGS

FIG. 1A illustrates, in a high level block diagram, prior art architecture of IEEE 1394 standard.

FIG. 1B illustrates, in a high level block diagram, a prior art link controller.

FIG. 2 illustrates, in a high level block diagram, a circuit that includes an application logic, a refetch logic, a link controller, and a PHY chip in accordance with one embodiment of the present invention.

FIG. 3 illustrates, in a block diagram, a refetch logic in accordance with one embodiment of the circuit illustrated in FIG. 2.

FIG. 4 illustrates, in a flow chart, a method used by the circuit illustrated in FIG. 2 to change a source of data for isochronous transmission.

FIG. 5 illustrates, in a timing diagram, the relationship between the transferred signals among a state machine, an application logic, and a link controller of FIG. 2 and FIG. 3.

FIG. 6 illustrates, in a state diagram, a state machine used to implement the refetch logic illustrated in FIG. 3 and the method illustrated in FIG. 4.

FIG. 7 illustrates, in a block diagram, a portion of a link controller illustrated in FIG. 2.

FIG. 8 illustrates, in a flow chart, a method used by the link controller to adapt to the change of a data source for isochronous transmission illustrated in FIG. 7.

FIG. 9 illustrates, in a timing diagram, the relationship between transferred signals among a second state machine, an application logic, and a PHY chip illustrated in FIGS. 2 and 7.

FIG. 10 illustrates, in a state diagram, a state machine used to implement the link controller in FIG. 7 and the method illustrated in FIG. 8.

DETAILED DESCRIPTION

In accordance to IEEE 1394 standard, one node among a number of nodes interconnected by a shared bus is responsible for time distribution to the other nodes. This node is known as the cycle master. Periodically the cycle master transmits a cycle start packet that is used by other nodes on the IEEE 1394 bus to synchronize their local clocks (also called "CYCLE_TIME register") and define the start of the phase in which only isochronous packets can be transmitted (also called "isochronous phase"). For an exemplary CYCLE_TIME register, see U.S. Pat. No. 6,633,989 entitled "Method and Mechanism for Synchronizing a Slave's Timer To A Master's Timer," by inventor Jack B. Hollins, filed Nov. 30, 1999, which is incorporated by reference above.

In order to meet the timing requirements to guarantee access to the bus before the isochronous phase is over, a link controller must make a bus request as soon as possible after the detection of a cycle start packet and the desire for isochronous transmission. In order to make timely isochronous bus request, the link controller must be made aware of the desire for isochronous transmission and packet dependent information necessary for bus request before the isochronous phase begins. This would be straight forward if the packet to be transmitted was known before the isochronous phase begins. However, in some isochronous applications, events can occur (after the isochronous phase begins but before the link controller begins packet transmission) that necessitate a change from a first packet that the link controller may have begun generating, to a second packet.

In one embodiment, a node 2 includes a refetch logic 5 (FIG. 2) that enables a link controller 6 to fetch data necessary to make a bus request and to generate a first packet in anticipation of data transmission from a first source. Refetch logic 5 further enables an application logic 4 to switch from the first source to a second source when necessary, so that link controller 6 will generate and transmit a second packet instead of the first packet.

Refetch logic 5 selectively passes data from one of two data sources to link controller 6. For example, refetch logic 5 supplies link controller 6 with data from a first source for generating a packet (also called "first packet") in anticipation of data transmission, and prior to transmission of the packet refetch logic 5 switches from first source to a second source if necessary. Specifically, refetch logic 5 propagates the data from a first data bus 406 to link controller 6 by default. Link controller 6 reads data supplied by refetch logic 5 and starts to generate the first packet. If an application decides to transmit data from a second bus 408 prior to transmission of the first packet, refetch logic 5 propagates data from second bus 408 to link controller 6. Refetch logic 5 also instructs link controller 6 to discard the first packet and to generate a new packet (also called "second packet").

In one embodiment, application logic 4 drives active a control signal (hereinafter "data transmit signal") when desiring data transmission. A line 402 carries the data transmit signal to a terminal 501 of refetch logic 5. In response to an active data transmit signal, refetch logic 5 requests data transmission by driving active another control signal ("hereinafter "transmission request signal"). A line 502 carries the transmission request signal to a terminal 601 of link controller 6.

In response to an active transmission request signal, link controller 6 drives another request signal ("hereinafter "medium request signal") to request control of a transmission medium 8. A bus 606 carries the medium request signal to a port 701 of a physical layer chip 7 (also called "PHY chip"). In response to the medium request signal, PHY chip 7 arbitrates for control of transmission medium 8 with other devices that share medium 8. PHY chip 7 drives a status signal (hereinafter called "medium grant signal") on a bus 702 when link controller 6 has won control of medium 8. Bus 702 is coupled to a port 609 of link controller 6. In response to the medium grant signal, link controller 6 drives active another status signal (hereinafter "transmission grant signal") to inform refetch logic 5 and application logic 4 that link controller 6 now has control of transmission medium 8. A line 602 carries the transmission grant signal to a terminal 509 of refetch logic 5 and to a terminal 401 of application logic 4.

In one embodiment, application logic 4 has two data buses 406 and 408 that are respectively coupled to input ports 505 and 507 of refetch logic 5. Refetch logic 5 propagates data from a first data bus 406 to an output bus 506 by default. When refetch logic 5 receives an active data refetch signal on a terminal 503, refetch logic 5 propagates data from a second data bus 408 to output bus 506. Terminal 503 is coupled to a line 404 that carries the data refetch signal from application logic 4. Refetch logic 5 also drives active a control signal (hereinafter "packet discard signal") to instruct link controller 6 to discard the first packet and to generate a second packet from new data on output bus 506. A line 504 carries the packet discard signal to a terminal 605 of link controller 6.

In this embodiment, refetch logic 5 continues to propagate data from data bus 408 to output bus 506 until an active signal (hereinafter "transmission finish signal") is received on a terminal 511. Data bus 506 is coupled to a port 607 of link controller 6. Link controller 6 generates a packet from the data received on port 607. Link controller 6 drives the packet on a bus 608, which is coupled to a port 703 of PHY chip 7 and the PHY chip 7 drives the packet on transmission medium 8 to other devices.

In one embodiment, link controller 6 fetches data from output bus 506 (which carries data from data bus 406 by default) after receiving the active transmission request signal on terminal 601, and before receiving the medium grant signal on port 609, in an act that is also called "prefetching." So, link controller 6 reads data from output bus 506 even before application logic 4 has decided what data is to be sent on transmission medium 8 (e.g., before deciding whether to transmit from data bus 406 or data bus 408).

In this embodiment, link controller 6 begins to generate the first packet from the prefetched data in response to receiving the active transmit request signal. At the time the transmission request signal is active, output bus 506 carries the data from bus 406 by default. In one implementation, for example, application logic 4 provides on bus 406 a header in the form of the first thirty-two bits of data 42 (when the transmission request signal is active) that is stored in a first in-first out (FIFO) buffer 46 (FIG. 3). In one variation, data 42 conforms to the data format illustrated in FIG. 1 and FIG. 2 of IEC 61883-4 (incorporated by reference above).

Link controller 6 of this embodiment reads and uses the header (e.g., the first thirty-two bits) of data 42 to start generating the first packet. In one variation, the first packet is an isochronous packet conforming to the data format illustrated in FIGS. 6–17 of IEEE 1394 standard (incorporated by reference above). The generation of an isochronous packet includes the insertion of an isochronous header, a cyclical redundancy check ("CRC") for the isochronous header, the data field (e.g., data 42), and a CRC for the data field according to Chapter 6 of IEEE 1394 standard.

In one variation, link controller 6 recovers a speed code included in the first thirty-two bits of data 42. Link controller 6 uses the speed code to transmit a bus request signal to PHY chip 7. This variation is further described below, in reference to FIG. 3 and FIG. 7.

In one embodiment, node 2 (FIG. 3) includes an application logic 4 that drives active the data transmit signal (e.g. signal "Isoxmitp" in FIG. 3) to request data transmission. In one embodiment, application logic 4 requests isochronous transmission in conformance to IEEE 1394 standard. Line 402 carries signal Isoxmitp to a terminal 513 of a state machine 52. In response to the active signal Isoxmitp, state machine 52 drives active the transmission request signal (e.g., in FIG. 3, signal "Isopktreqn").

In this embodiment, state machine 52 causes a multiplexer 54 to propagate data from data bus 406 (received on a port 521) to output bus 506 by default. State machine 52 causes multiplexer 54 to propagate data from data bus 408 (received on port 523) to output bus 506 when state machine 52 receives an active data refetch signal (e.g. signal "Refetch_conditionp" in FIG. 3) on a terminal 515 coupled line 404. State machine 52 causes multiplexer 54 to propagate signals from bus 408 to bus 506 by driving active a mux control signal (e.g., in FIG. 3, signal "Isosourcelp") on a line 508 coupled to a control terminal 525 of multiplexer 54. State machine 52 drives the mux control signal active until it receives an active transmission finish signal (e.g., in FIG. 3, signal "Confirmn") on a terminal 519 coupled to line 604.

Depending on the implementation, any one of various requirements that depend on a specific standard being implemented (e.g., IEC 61883-4 may require that a stale or incomplete packet in the packet transmitter to be discarded and be replaced with a new packet) or the specific application (which may be doing flow control or be too slow in generating data 42) can cause application logic 4 to drive the data refetch signal active, thereby to switch from data bus 406 to data bus 408.

In one embodiment, application logic 4 must decide to switch from data bus 406 to data bus 408 within a specified time (also called "refetch time") after receiving an active transmission grant signal (e.g., in FIG. 3, signal "Isogntp") on terminal 401. Otherwise link controller 6 begins transmission of the first packet formed from data prefetched from bus 506. In one implementation, the first packet is an isochronous packet in conformance with IEEE 1394 standard.

State machine 52 informs link controller 6 of any change in the data source so that link controller 6 can discard a first packet generated from prefetched data and generate a second packet from the data on bus 408. If such change is not supported, the first packet generated by link controller 6 is defective because of the change in data source.

State machine 52 drives active packet discard signal (e.g., in FIG. 3, signal "Isorefetchp") to inform link controller 6 of the switch from data bus 406 to data bus 408. As previously described, link controller 6 waits for a specified time, e.g., the refetch time, before starting data transmission. During the refetch time, application logic 4 may decide to switch from data bus 406 to bus 408 and instruct state machine 52 to drive the packet discard signal active. After link controller finishes data transmission, link controller 6 drives the transmission finish signal active to indicate that state machine 52 can once again request data transmission.

State machine 52 starts with action 82 (FIG. 4) and initializes all signals as inactive. Action 82 is followed by action 84. In action 84, state machine 52 determines if application logic 4 requests data transmission. Application logic 4 drives active the data transmit signal (e.g., in FIG. 3, signal "Isoxmitp") if it desires data transmission. Action 84 is followed by action 86 if state machine 52 receives an active signal Isoxmitp at terminal 513. Otherwise, action 84 loops back to itself to wait for an active signal Isoxmitp.

In action 86, state machine 52 drives an active signal Isopktreqn on line 502 to request isochronous transmission from link controller 6. Action 86 is followed by action 88. In action 88, state machine 52 determines if link controller 6 has control of transmission medium 8 for data transmission. State machine 52 receives an active signal Isogntp on terminal 517 if link controller 6 has control of transmission medium 8. Action 88 is followed by action 90 if link controller 6 has control of transmission medium 8. Otherwise, action 88 loops back to itself to wait for an active signal Isogntp.

In action 90, state machine 52 determines if application logic 4 wishes to switch the source of data from data bus 406 to data bus 408. State machine 52 receives an active signal Refetch_conditionp on terminal 515 if application logic 4 wishes to switch from data bus 406 to data bus 408. Action 90 is followed by action 94 if application logic 4 wishes to switch the data source. Otherwise, action 90 is followed by action 92.

In action 92, state machine 52 waits for link controller 6 to finish data transmission. State machine 52 receives an active signal Confirmn on terminal 519 when link controller 6 finishes data transmission. Action 92 is followed by action 84. In action 94, state machine 52 causes multiplexer 54 to propagate data from bus 408 to bus 506. Action 94 is followed by action 92.

In one example, at time t0 (FIG. 5) application logic 4 drives active signal Isoxmitp to indicates its desire for data transmission. Signal Isoxmitp remains active until application logic 4 does not desire data transmission. At time t1, state machine 52 drives active signal Isopktreqn to request isochronous transmission on transmission medium 8 in response to the active signal Isoxmitp. Signal Isopktreqn remains active as long as signal Isoxmitp is active. At this time, multiplexer 54 propagates data from port 525 (coupled to data bus 406, also called "first source") to output bus 506 because signal Isosourceselp is inactive. Signal Isosourceselp is inactive because state machine 52 has yet to receive an active signal Refetch_conditionp.

Between time t1 and time t3, state machine 52 waits for the result of the bus arbitration. At time t3, state machine 52 receives an active signal Isogntp. The active signal Isogntp indicates that link controller 6 has control of transmission medium 8 and that link controller 6 will wait for an active signal Isorefetchp for a specified time, i.e., the refetch time (e.g., 4 clock cycles), before starting isochronous transmission to PHY chip 7. In one implementation, transmission medium 8 is a serial bus in conformance with IEEE 1394 standard.

At time t3, state machine 52 drives active signal Isosourceselp in response to receiving an active signal Refetch_conditionp and the active signal Isogntp. Signal Refetch_conditionp remains active until a specified condition that requires the switch from data bus 406 to data bus 408 no longer exits. Multiplexer 54 propagates signals from port 523 (coupled to data bus 408) to data bus 506 in response to the active signal Isosourceselp. As illustrated in FIG. 5, multiplexer 54 propagates, and link controller 6 receives, data from data bus 408 (also called "second source") from time t4 to time t5 because signal Isosourceselp is active. Also at time t3, state machine 52 drives active signal Isorefetchp in response to the active signal Refetch_conditionp and the active signal Isogrntp.

Active signal Isorefetchp informs link controller 6 that the data source has changed and that link controller 6 must discard the first packet formed from prefetched data and generate the second packet. The time period from time t3 to time t5 is for example the specified time (the refetch time) within which application logic 4 must decide to change from data bus 406 to data bus 408. As shown in FIG. 5, link controller 6 starts to transmit the second packet at time t5, which is the end of the refetch time.

At time t7, state machine 52 receives an active signal Confirmn that indicates link controller has finished transmitting the second packet and that state machine 52 can again request data transmission on transmission medium 8. As shown in FIG. 5, application logic 4 continues to drives active signal Isoxmitp to indicate its desire for data transmission and state machine 52 drives continues to drive signal Isopktreqn active in response to the active signal Isoxmitp.

At time t9, state machine 52 receives an active signal Isogntp, indicating that link controller 6 has control of the bus and that link controller 6 will await an active signal Isorefetchp for a specified time, i.e., refetch time, before starting data transmission to PHY chip 7. As the timing diagram illustrates, link controller 6 continues to receive data from data bus 406 (first source) because signals Refetch_conditionp, Isosourceselp, and Isorefetchp are inactive from time t8 to time t14. As the timing diagram shows, link controller 6 starts to transmit the first packet at time t11, which is the end of the refetch time. At time t9, state machine drives signal Isopktreqn inactive in response to an inactive signal Isoxmitp.

At time t13, state machine 52 receives an active signal Confirmn, indicating link controller 6 has transmitted the first packet and that state machine 52 can once again request data transmission. However, state machine 52 does not make another request (drive active signal Isopktreqn) at time t14 because application logic 4 no longer desires data transmission (inactive signal Isoxmitp).

A state diagram (FIG. 6) provides that state machine 52 starts in state 1 (also called "1st start state"). State machine 52 transitions from state 1 to state 2 (also called "data transmission state") on receiving an active signal Isoxmitp on terminal 513. During transition from state 1 to state 2, state machine 52 drives an active signal Isopktreqn on line 502. The condition and action of this transition are captioned in box 96.

State machine 52 transitions from state 2 to state 3 (also called "1st wait state") after receiving an active signal Isogntp on terminal 517. During transition from state 2 to state 3, state machine 52 drives active signal Isopktreqn, and inactive signal Isosourceselp and signal Isorefetchp. The condition and action of this transition are captioned in box 98.

State machine 52 transitions from state 3 to state 1 after receiving an active signal Confirmn on terminal 519. During transition from state 3 to state 1, state machine 52 drives inactive the following: signal Isosourceselp, signal Isopktreqn, and signal Isorefetchp.

State machine 52 transitions from state 2 to state 4 (also called "refetch state") on receiving an active signal Refetch_conditionp. During transition from state 2 to state 4, state machine 52 drives active signal Isosourceselp on line 508 and signal Isopktreqn on line 502. The conditions and actions of this transition are captioned in box 102.

State machine 52 transitions from state 4 to state 1 after receiving an active signal Confirmn on terminal 519. State machine 52 transitions from state 4 to state 5 by driving inactive the following: signal Isosourceselp, signal Isopktreqn, and signal Isorefetchp.

In one embodiment, node 2 (FIG. 2) conforms to IEC 61883-4 standard. In accordance to a condition of IEC 61883-4, a transmitter that is active in using transmission medium 8, e.g., an application logic 4 that requests isochronous transmission, must transmit a packet containing data in every cycle of a predetermined frequency, e.g., 8 kHz or 125 microseconds. Otherwise, such a transmitter must transmit an empty packet, also called empty "common isochronous packet" abbreviated empty "CIP", if there is not enough data to transmit a data packet.

There may not be enough data to generate a data packet, e.g., if application logic 4 generates less data within a single cycle than a bandwidth allocated to application logic 4 (by an IEEE 1394 isochronous resource manager), in which case data generated in two or more cycles may be transmitted in a single packet which is preceded and followed by empty CIPs.

In this embodiment, application logic 4 supplies either data 42 (FIG. 3) on data bus 406 or data 44 of an empty CIP packet on data bus 408. As noted above, application logic 4 may decide to transmit data 44 instead of data 42 if there is not enough data to transmit an isochronous packet. If so, application logic 4 drives an active signal Refetch_conditionp on line 404 to refetch logic 5. Application logic 4 must determine this condition within the specified time after receiving an active signal Isogntp on terminal 401 because thereafter link controller 6 starts isochronous transmission of the packet.

State machine 52 causes multiplexer 54 to propagate the empty CIP packet signals from data bus 408 to data bus 506 in response to an active signal Refetch_conditionp. State machine 52 also drives an active signal Isorefetchp on line 504 to instruct link controller 6 to discard the first packet formed from prefetched data 42 from output bus 506. In one implementation, application logic 4 stores data 42 in a first in-first out buffer (FIFO) 46, where the output of first in-first out buffer 46 is data bus 406.

Application logic 4 uses a storage level indicator of first in-first out buffer 46 to determine if there is enough data to transmit an isochronous packet in accordance to IEC 61883-4. Application logic also includes a bit pattern generator 48 that generates an empty CIP packet in accordance to IEC 61883-1, where the output of bit pattern generator 48 is provided on data bus 408. If application logic 4 determines within the refetch time that there is not enough data, application logic 4 drives an active signal Refetch_conditionp.

In this implementation, application logic 4 also recovers a time stamp from a header from data 42. IEC 61883-4 requires that data with a time stamp that points in the past ("late packet") should not be transmitted. Thus, application logic 4 compares the recovered time stamp to the current cycle time stored in a cycle control 68 (FIG. 7) to determine if data 42 should be transmitted. Application logic 4 drives an active signal Refetch_conditionp if data 42 is not to be transmitted.

For an exemplary cycle control 68, see U.S. Pat. No. 6,633,989, entitled "Method and Mechanism for Synchronizing A Slave's Timer To A Master's Timer," by inventor Jack B. Hollins, filed Nov. 30, 1999, which is incorporated herein by reference in its entirety. Note that another cycle control is used in another embodiment. Furthermore, in yet another embodiment, application logic 4 drives signal Refresh_conditionp active under other conditions, such as availability of data following the above-described "late packet."

In one embodiment, link controller 6 (FIG. 7) includes a state machine 62. State machine 62 includes a terminal 611 coupled to receive signal Isopktreqn on line 502. In response to an active signal Isopktreqn on terminal 611, state machine 62 drives an active signal Isolreqn on line 616 to request a PHY-link interface 69 to transmit a bus request to PHY chip 7. Line 616 is coupled to terminal 629 of PHY-link interface 69.

In response to an active signal Isolreqp on terminal 629, PHY-link interface 69 drives signal LReq on bus 606 to PHY chip 7. An example of signal LReq is a seven bit bus request signal conforming to the requirements of Annex J of IEEE 1394 standard. In this example, signal LReq has a start bit, a three bit request type field, a two bit request speed field, and a stop bit. An active signal Isolreqp indicates to PHY-link interface 69 that the request type field is to be filled with a code for arbitration of isochronous transmission. A dedicated line (also called "speed code line") 410 from application logic 4 provides to PHY-link interface 69 a speed code.

In one variation, link controller 6 recovers a speed code from the header (e.g., the first 32 bits) of data 42 read from output bus 506. In the example, a packet transmitter 64 that is included in link controller 6 recovers the speed code from the first 32 bits of data 42 and transmits the speed code on a line 622 coupled to a terminal 633 of PHY-link interface 69 that is included in link controller 6. PHY-link interface 69 includes the speed code in signal LReq to PHY chip 7 to arbitrate for transmission medium 8.

Upon winning arbitration, PHY chip 7 drives signal Ctl on line 702 to inform link controller 6 of the result. Signal Ctl is, for example, a two bit status signal formatted in accordance to Annex J of IEEE 1394 standard. Line 702 is coupled to port 635 of PHY-link interface 69. In response to the signal Ctl, PHY-link interface 69 drives an active signal Arbgntp on line 618. Line 618 is coupled to terminal 615 of state machine 62.

In response to an active signal Arbgntp, state machine 62 drives active the signal Isogntp on line 602 to inform application logic 4 and refetch logic 5 that link controller 6 has control of transmission medium 8. Line 602 is coupled to terminal 509 of refetch logic 5 and terminal 623 of packet transmitter 64.

After driving signal Isogntp active, state machine 62 drives signal Discardp active on line 610 if state machine 62 receives an active signal Isorefetchp on terminal 613 prior to receiving an active signal Refetchtimeoutp on terminal 619. An active signal Discardp instructs packet transmitter 64 to discard the first packet formed from prefetched data received on port 625, which is coupled to bus 506 of refetch logic 5. State machine 62 does not drive signal Discardp active if state machine 62 receives an active signal Refetchtimeoutp.

Terminal 623 of packet transmitter 64 is coupled to line 602 carrying signal Isogntp. In response to an active signal Isogntp, packet transmitter 64 waits for a predetermined time (also called "specified time" or "refetch time"), e.g., 4 clock cycles. If packet transmitter 64 receives an active signal Discardp on terminal 621 within the specified time, packet transmitter 64 does the following: (1) discard the first packet formed from prefetched signals received on port 625 (coupled to bus 506) and (2) generate and transmit the second packet formed from data received on port 625. If packet transmitter 64 does not receive an active signal Discardp on terminal 621 within the specified time, packet transmitter 64 (1) transmits the first packet on a bus 620 coupled to a terminal 627 of PHY-link interface 69 and (2) drives active signal Refetchtimeoutp on line 614 coupled to terminal 619 of state machine 62 to indicate that data transmission has started. Under either condition, packet transmitter 64 drives signal Endxmitp active on line 612 after transmitting one packet. Line 612 is coupled to terminal 617 of state machine 62.

In response to an active signal Endxmitp on terminal 617, state machine 62 drives active signal Confirmn on line 604 to inform refetch logic 5 that data transmission is complete and that refetch logic 5 can once again request data transmission.

State machine 62 (FIG. 8) starts in action 106 and initializes all signals as inactive. Action 106 is followed by action 108. In action 108, state machine 62 determines if refetch logic 5 desires to transmit data. State machine 62 receives an active signal Isopktreqn on terminal 601 if refetch logic 5 desires data transmission. Action 108 is followed by action 110 if refetch logic 5 desires to transmit data. Otherwise, action 108 loops back to itself to wait for an active signal Isopktreqn.

In action 110, state machine 62 drives active signal Isolreqp on line 616. An active signal Isolreqp instructs PHY-link interface 69 to request PHY chip 7 for isochronous transfer on transmission medium 8. Action 110 is followed by action 112. In action 112, state machine 62 determines if link controller 6 has control of bus 8 for data transmission. Link controller 6 has control of transmission medium 8 if state machine 62 receives an active signal Arbgntp on terminal 615. Action 110 is followed by action 114 if state machine 62 receives an active signal Arbgntp on terminal 615. Otherwise, action 110 loops back to itself to wait for an active signal Arbgntp.

In action 114, state machine 62 informs refetch logic 5 that link controller 6 has control of bus 8. To do so, state machine 62 drives active signal Isogntp on line 602. Action 114 is followed by action 116. In action 116, state machine 62 determines if, prior to a predetermined time, refetch logic 5 instructs packet transmitter 64 to discard the first packet formed from prefetched data. The predetermined time corresponds to a time period after state machine 62 drives an active signal Isogntp on line 602 and before state machine 62 receives an active signal Refetchtimeoutp on terminal 515. Action 114 is followed by action 118 if, prior to the predetermined time, refetch logic 5 instructs packet transmitter 64 to discard a portion of the first packet formed from prefetched data. Otherwise, action 114 is followed by action 120.

In action 118, state machine 62 instructs packet transmitter 64 to discard the first packet formed from prefetched signals from port 625. To do so, state machine 62 drives active signal Discardp on line 610. Action 118 is followed by action 120. In action 120, state machine 62 waits for packet transmitter 64 to finish isochronous transmission. State machine 62 receives an active signal Endxmitp on terminal 617 when packet transmitter 64 finishes isochronous transmission. Action 120 is followed by action 122. In action 122, state machine 62 informs refetch logic 5 that it can once again request isochronous transmission. To do so, state machine 62 drives an active signal Confirmn on line 604.

In one example, at time tl01 (FIG. 9), refetch logic 5 drives signal Isopktreqn active to request data transmission on transmission medium 8. At time t101, state machine 62 drives active signal Isolreqp on line 616 to request control of transmission medium 8 in response to the active signal Isopktreqn.

From time t101 to time t 103, state machine 62 waits the result of the bus arbitration. At time t 103, state machine 62 receives an active signal Arbgntp indicating that link controller 6 has control of transmission medium 8. Also at time t103, state machine 62 drives signal Isogntp active on line 602 in response to the active signal Arbgntp. An active signal Isogntp indicates to refetch logic 5 that link controller 6 has transmission medium 8 and will wait for an active signal Isorefetchp for a specified time period (e.g., 4 clock cycles) before starting isochronous transmission to PHY chip 7.

At time t104, state machine 62 receives an active signal Isorefetchp on terminal 613. As the timing diagram shows, state machine 62 receives the active signal Isorefetchp prior to receiving an active signal Refetchtimeoutp on terminal 619 at time t106. Thus, state machine 62 drives an signal Discardp active on line 610 to instruct packet transmitter 64 to discard the first packet formed from prefetched data and to generate the second packet from data received on port 625. As the timing diagram shows, packet transmitter 64 receives data from the second source (bus 408) and the link controller generates the second packet from time t105 to time t108.

At time t107, state machine 62 receives a signal Endxmitp active on terminal 617. An active signal Endxmitp informs state machine 62 that data transmission is complete. At time t107, state machine 62 drives signal Confirmn active on line 604 in response to the active signal Endxmitp. An active signal Confirmn informs refetch logic 5 that it may once again request isochronous transmission. As FIG. 9 illustrates, link controller 6 transmits a second packet after t106, which is the end of the refetch time.

At time t109, state machine 62 receives an signal Isopktreqn active on terminal 611. Also at time t109, state machine 62 drives signal Isolreqp active on line 616 to request control of transmission medium 8 in response to the active signal Isopktreqn. As FIG. 9 illustrates, link controller 6 transmits a first packet after t115, which is the end of the refetch time.

At time t115, state machine receives signal Refetchtimeoutp active at terminal 619 prior to receiving an active Isorefetchp signal. Accordingly, state machine 62 no longer discards the first packet formed from prefetched data.

State machine 62 (FIG. 10) starts in state 5 (also called "2nd start state"). State machine 62 transitions from state 5 to state 6 (also called "bus request state") on receiving an active signal Isopktreqn on terminal 611. To transition from state 1 to state 2, state machine 62 drives signal Isolreqp active on line 616. The condition and action of this transition are captioned in box 124.

State machine 62 transitions from state 6 to state 7 (also called "2nd wait state") on receiving an active signal Arbgntp on terminal 615. To transition from state 2 to state 3, state machine 62 drives signal Isogntp active on line 602. The condition and action of this transition are captioned in box 126.

State machine 62 transitions from state 7 to state 8 (also called "3rd wait state") on receiving an active signal Isorefetchp on terminal 613 prior to receiving an active signal Refetchtimeoutp on terminal 619. If this condition occurs, state machine 62 drives signal Discardp active on line 610 during the transition from state 7 to state 8. The conditions and action of this transition are captioned in box 128.

State machine 62 also transitions from state 7 to state 8 on receiving an active signal Refetchtimeoutp on terminal 619 prior to receiving an active signal Isorefetchp on terminal 613. If this occurs, state machine 62 drives inactive the following during the transition from state 7 to state 8: signal Isogntp, signal Confirmn, signal Discardp, and signal Isolreqp. The conditions and actions of this transition are captioned in box 130.

State machine 62 transitions from state 8 and state 5 on receiving an active signal Endxmitp on terminal 617. To transition from state 4 and 5 to state 1, state machine 62 drives signal Confirmn active on line 604. The condition and action for these transitions are captioned in box 132.

Numerous modifications and adaptations of the embodiments described herein will be apparent to the skilled artisan in view of the disclosure. For example, state machine 52 and state machine 62 can be included in a single state machine that has all their functionality. Furthermore, state machine 52 and state machine 62 can be used with other standards which have different conditions for switching a data source. Numerous such changes and modifications are encompassed by the attached claims.

APPENDIX A

```
/****************************************************************
********
 *
 *
 *
 * Description: This module implements isorefetch mechanism
 *
 *                                                              *
 ****************************************************************
*****/
// %W%
'timescale 1 ns / 1 ns
module applogic ( resetp ,
                clkp ,
                isoxmitp ,
                isogntp ,
                confirmn ,
                refetch_conditionp ,
                isopktreqn ,
                isorefetchp ,
                isosourceselp );
// from application logic
input   clkp ; // clock
input   resetp ; // reset
// from software writtable register
input   isoxmitp ; // iso transmission initiate control
// from 1394 link layer controller
input   isogntp ; // actual transmission is about to begin
input   confirmn ; // transmission is complete
// from application logic
input   refetch_conditionp ; // default source invalid
// to 1394 link layer controller
output  isopktreqn ; // request for iso transmission
output  isorefetchp ; // packet source has changed, discard any
                                    // prefetched data and read from start of
                                    // packet
// to application logic
output  isosourceselp ; // link layer controller packet
output
// source selector
//***************************** PARAMETERS
*****************************
   parameter FF_DELAY = 1;
// ***************************** REG
*****************************
   reg     ctl_isopktreqn ;
   reg     ctl_isorefetchp ;
   reg     ctl_isosourceselp ;
   reg [3:0]   stateap ;
   reg     isopktreqn ;
   reg     isorefetchp ;
   reg     isosourceselp ;
   reg     idle ;
   reg     transmitreq ;
   reg     transmitdefault ;
   reg     transmitsecondary ;
   wire [3:0]  nextstateap ;
   wire    IDLE ;
   wire    TRANSMITREQ ;
   wire    TRANSMITDEFAULT ;
   wire    TRANSMITSECONDARY ;
   assign IDLE = stateap [0] ;
   assign TRANSMITREQ = stateap [1] ;
   assign TRANSMITDEFAULT = stateap [2] ;
   assign TRANSMITSECONDARY = stateap [3] ;
   assign nextstateap[0] = idle ;
   assign nextstateap[1] = transmitreq ;
   assign nextstateap[2] = transmitdefault ;
   assign nextstateap[3] = transmitsecondary ;
always @ ( posedge clkp )
   begin
      if ( resetp )
         begin
```

-continued

APPENDIX A

```
            stateap <= #FF_DELAY 4'h1 ;
         end
      else
         begin
            stateap <= #FF_DELAY nextstateap ;
         end
   end
always @ ( posedge clkp )
   begin
      if ( resetp )
         begin
            isopktreqn <= #FF_DELAY 1'b1 ;
            isorefetchp <= #FF_DELAY 1'b0 ;
            isosourceselp <= #FF_DELAY 1'b0 ;
         end
      else
         begin
            isopktreqn <= #FF_DELAY ctl_sopktreqn ;
            isorefetchp <= #FF_DELAY ctl_isorefetchp ;
            isosourceselp <= #FF_DELAY ctl_isosourceselp ;
         end
   end
always @ (/*AUTOSENSE*/IDLE or TRANSMITDEFAULT or
      TRANSMITREQ or TRANSMITSECONDARY or confirm or
      isogntp or isoxmitp or refetch_conditionp)
begin
   // initialization prevents latches
   idle = 1'b0 ;
   transmitreq = 1'b0 ;
   transmitdefault = 1'b0 ;
   transmitsecondary = 1'b0 ;
   ctl_isopktreqn = 1'b1 ;
   ctl_isorefetchp = 1'b0 ;
   ctl_isosourceselp = 1'b0 ;
   case (1'b1)
      IDLE : casez ( isoxmitp )
         1'b0 : idle = 1'b1 ;
         1'b1 : transmitreq = 1'b1 ;
//summit modcovoff -b
         default : idle = 1'bx ;
//summit modcovon -b
         endcase // casez( isoxmitp )
      TRANSMITREQ : casez ( { isogntp ,refetch_conditionp } )
         2'b0? : begin
            transmitreq = 1'b1 ;
            ctl_isopktreqn = 1'b0 ;
            end
         2'b10 : begin
            transmitdefault = 1'b1 ;
            ctl_isopktreqn = 1'b0 ;
            end
         2'b11 : begin
            transmitsecondary = 1'b1 ;
            ctl_isopktreqn = 1'b0 ;
            ctl_isorefetchp = 1'b1 ;
            ctl_isosourceselp = 1'b1 ;
            end
//summit modcovoff -b
         default : transmitreq = 1'bx ;
//summit modcovon -b
         endcase // casez( { isogntp ,refetch_conditionp } )
      TRANSMITDEFAULT : casez ( confirmn )
         1'b0 : idle = 1'b1 ;
         1'b1 : begin
            transmitdefault = 1'b1 ;
            ctl_isopktreqn = 1'b0 ;
            end
//summit modcovoff -b
         default transmitdefault = 1'bx ;
//summit modcovon -b
         endcase // casez( confirmn )
      TRANSMITSECONDARY : casez ( confirmn )
         1'b0 : idle = 1'b1 ;
         1'b1 : begin
            transmitsecondary = 1'b1 ;
            ctl_isopktreqn = 1'b0 ;
```

APPENDIX A

```
            ctl_isosourcelp = 1'b1 ;
          end
//summit modcovoff -b
            default : transmitsecondary = 1'bx ;
//summit modcovon -b
            endcase // casez( confirmn )
      default : begin // snafu: if no state bit set
        idle = 1'bx ;
        transmitreq = 1'bx ;
        transmitdefault = 1'bx ;
        transmitsecondary = 1'bx ;
        ctl_isopktreqn = 1'bx ;
        ctl_isorefetchp = 1'bx ;
        ctl_isosourcelp = 1'bx ;
          end
      endcase // case(1'b1)
    end
endmodule
```

APPENDIX B

```
/*****************************************************
********
 *
 *
 *
 * Description: This module implements isorefetch mechanism (link side)    *
 *                                                                  *
 *****************************************************
*****/
// %W%
`timescale 1 ns / 1 ns
module linklogic ( resetp ,
                   clkp ,
                   isopktreqn ,
                   isorefetchp ,
                   arbgntp ,
                   endxmitp ,
                   refetchtimeoutp ,
                   isogntp ,
                   confirmn ,
                   isolreqp ,
                   discardp ,
                   );
  input resetp ; // reset
  input clkp ; // clock
// from application logic
  input      isopktreqn ; // request for iso transmission
  input      isorefetchp ; // packet source has changed, discard any
                           // prefetched,data and read from start of
                           // packet
// from phy/link interface
  input      arbgntp ;
// from link transmitter
  input      endxmitp ; // transmission finished
  input      refetchtimeoutp ; // window for refetch assertion is closed
// to application logic
  output     confirmn ; // transmission is complete
// to phy/link interface
  output     isolreqp ; // generate iso lreq
// to application logic & link transmitter
  output     isogntp ; // actual transmission is about to begin
  output     discardp ; // asserted if isorefetchp asserted from
```

APPENDIX B

```
application
                        // logic
//****************************** PARAMETERS
**********************************
  parameter FF_DELAY = 1;
// ****************************** REG
*********************************
  reg        ctl_isogntp ;
  reg        ctl_confirmn ;
  reg        ctl_isolreqp ;
  reg        ctl_discardp
  reg [3:0]      stateap ;
  reg        isogntp ;
  reg        confirmn ;
  reg        isolreqp ;
  reg        discardp ;
  reg            idle ;
  reg            waitforgnt ;
  reg            refetchwindow ;
  reg            transmit ;
  wire [3:0]     nextstateap ;
  wire       IDLE ;
  wire       WAITFORGNT ;
  wire       REFETCHWINDOW ;
  wire       TRANSMIT ;
  assign IDLE = stateap[0] ;
  assign WAITFORGNT = stateap[1] ;
  assign REFETCHWINDOW = stateap[2] ;
  assign TRANSMIT = stateap[3] ;
  assign nextstateap[0] = idle ;
  assign nextstateap[1] = waitforgnt ;
  assign nextstateap[2] = refetchwindow ;
  assign nextstateap[3] = transmit ;
always @ ( posedge  clkp )
  begin
    if ( resetp )
      begin
        stateap <= #FF_DELAY 4'h1 ;
      end
    else
      begin
        stateap <= #FF_DELAY nextstateap ;
      end
  end
always @ ( posedge clkp )
  begin
    if ( resetp )
      begin
        isogntp <= #FF_DELAY 1'b0 ;
        confirmn <= #FF_DELAY 1'b1 ;
        isolreqp <= #FF_DELAY 1'b0 ;
        discardp <= #FF_DELAY 1'b0 ;
      end
    else
      begin
        isogntp <= #FF_DELAY ctl_isogntp ;
        confirmn <= #FF_DELAY ctl_confirmn ;
        isolreqp <= #FF_DELAY ctl_isolreqp ;
        discardp <= #FF_DELAY ctl_discardp ;
      end
  end
always @ (/*AUTOSENSE*/IDLE or REFETCHWINDOW or TRANSMIT or WAITFORGNT
          or arbgntp or endxmitp or isopktreqn or isorefetchp
          or refetchtimeoutp)
begin
    // initialization prevents latches
    idle = 1'b0 ;
    waitforgnt = 1'b0 ;
    refetchwindow = 1'b0 ;
    transmit = 1'b0 ;
    ctl_isogntp = 1'b0 ;
    ctl_confirmn = 1'b1 ;
    ctl_isolreqp = 1'b0 ;
    ctl_discardp = 1'b0 ;
    case (1'b1)
```

-continued

APPENDIX B

```
            IDLE : casez ( isopktreqn )
                1'b1 : idle = 1'b1 ;
                1'b0 : begin
                    waitforgnt = 1'b1 ;
                    ctl_isolreqp = 1'b1 ;
                    end
//summit modcovoff -b
                    default : idle = 1'bx ;
//summit modcovon -b
                endcase // casez( isopktreqn )
            WAITFORGNT : casez ( arbgntp )
                1'b0 : waitforgnt = 1'b1 ;
                1'b1 : begin
                    refetchwindow = 1'b1 ;
                    ctl_isogntp = 1'b1 ;
                    end
//summit modcovoff -b
                    default : waitforgnt = 1'bx ;
//summit modcovon -b
                endcase // casez( arbgntp )
            REFETCHWINDOW : casez ( { isorefetchp , refetchtimeoutp } )
                2'b00 : begin
                    refetchwindow = 1'b1 ;
                    end
                2'b10 : begin
                    transmit = 1'b1 ;
                    ctl_discardp = 1'b1 ;
                    end
                2b?1 : begin
                    transmit = 1'b1 ;
                    end
//summit modcovoff -b
                    default : refetchwindow = 1'bx ;
//summit modcovon -b
                endcase // casez( { isorefetchp , refetchtimeoutp } )
            TRANSMIT : casez ( endxmitp )
                1'b1 : begin
                    idle = 1'b1 ;
                    ctl_confirmn = 1'b0 ;
                    end
                1'b0 : begin
                    transmit = 1'b1 ;
                    end
//summit modcovoff -b
                    default : transmit = 1'bx ;
//summit modcovon -b
                endcase // casez( endxmitp )
                default : begin // snafu: if no state bit set
            idle = 1'bx ;
            waitforgnt = 1'bx ;
            refetchwindow = 1'bx ;
            transmit = 1'bx ;
            ctl_isogntp = 1'bx ;
            ctl_confirmn = 1'bx ;
            ctl_isolreqp = 1'bx ;
            ctl_discardp = 1'bx ;
                end
            endcase // case(1'b1)
        end
endmodule
```

What is claimed is:

1. A method of preparing data for a transmission, the method comprising:

transmitting a first signal requesting permission to transmit data;

generating a first packet from data of a first source prior to receiving a second signal granting permission to transmit data;

generating a third signal requesting a change of data source from the first source to a second source subsequent to said generating of said first packet, wherein said generating of said third signal occurs if the data of the first source is incomplete for said transmission; and generating a second data packet from data of the second source.

2. The method of claim 1, wherein said generating of the third signal occurs if a time stamp included in the data of the first source is later than a time of receiving the second signal.

3. The method of claim 1, further comprising:

discarding the first data packet prior to said transmission in response to said change to said second data source.

4. The method of claim 1, wherein said generating of the third signal occurs after said receiving of said second signal.

5. A method of preparing data for a transmission, the method comprising:

transmitting a first signal requesting permission to transmit data;

generating a first packet from data of a first source prior to receiving a second signal granting permission to transmit data;

generating a third signal requesting a change of data source from the first source to a second source subsequent to said generating of said first packet, wherein said generating of said third signal occurs if a time stamp included in the data of the first source is later than a time of receiving the second signal; and generating a second data packet from data of the second source.

6. An apparatus for preparing data for a transmission, comprising:

means for transmitting a first signal requesting permission to transmit data;

means for generating a first packet from data of a first source prior to receiving a second signal granting permission to transmit data;

means for receiving a third signal requesting a change of data source from the first source to a second source subsequent to said generating of said first packet, wherein said receiving of said third signal occurs if the data of the first source is incomplete to for said transmission; and means for generating a second data packet from data of the second source.

7. The method of claim 1, wherein a link controller generates said second packet when the second signal is active.

8. The apparatus of claim 6, wherein said receiving of the third signal occurs if a time stamp included in the data of the first source is later than a time of receiving the second signal.

9. The method of claim 1, wherein said second packet defines an empty packet without data.

10. The method of claim 1, further comprising:

recovering a speed code from said data of said first source for use in arbitrating for said second signal granting said permission to transmit.

11. The method of claim 1, further comprising:

transmitting said data of said first source in response to said third signal remaining inactive during a specified period.

12. The method of claim 1, further comprising:

discarding said first packet prior to said transmission in response to said generating of said third signal occurring within a specified time.

13. The method of claim 1, wherein said first packet comprises an isochronous packet conforming to an Institute of Electrical and Electronics Engineering 1394 standard.

14. The method of claim 5, wherein said generating of the third signal occurs if the data of the first source is incomplete for said transmission.

15. The method of claim 5, wherein said second packet defines an empty packet without data.

16. The method of claim 5, further comprising:
recovering a speed code from said data of said first source for use in arbitrating for said second signal granting said permission to transmit.

17. The method of claim 5, further comprising:
transmitting said data of said first source in response to said third signal remaining inactive during a specified period.

18. The method of claim 5, further comprising:
discarding said first packet prior to said transmission in response to said generating of said third signal occurring within a specified time.

19. The method of claim 5, wherein said first packet comprises an isochronous packet conforming to an Institute of Electrical and Electronics Engineering 1394 standard.

20. An apparatus for preparing data for a transmission, comprising:
means for transmitting a first signal requesting permission to transmit data;
means for generating a first packet from data of a first source prior to receiving a second signal granting permission to transmit data;
means for receiving a third signal requesting a change of data source from the first source to a second source subsequent to said generating of said first packet, wherein said receiving of said third signal occurs if a time stamp included in the data of the first source is later than a time of receiving the second signal; and
means for generating a second data packet from data of the second source.

\* \* \* \* \*